United States Patent
Maguire et al.

(10) Patent No.: US 8,108,260 B2
(45) Date of Patent: Jan. 31, 2012

(54) SYSTEM AND METHOD FOR DYNAMIC CATEGORIZATION

(75) Inventors: Christopher Maguire, Berkeley, CA (US); Robert Kalin, Brooklyn, NY (US); Haim Schoppik, Jersey City, NJ (US)

(73) Assignee: ETSY, Inc., New York, NY (US)

( * ) Notice: Subject to any disclaimer, the term of this patent is extended or adjusted under 35 U.S.C. 154(b) by 1222 days.

(21) Appl. No.: 11/828,797

(22) Filed: Jul. 26, 2007

(65) Prior Publication Data
US 2008/0046343 A1   Feb. 21, 2008

Related U.S. Application Data

(60) Provisional application No. 60/834,079, filed on Jul. 28, 2006.

(51) Int. Cl.
*G06Q 30/00*   (2006.01)
(52) U.S. Cl. ............... 705/26.1; 705/27.1; 705/26.8; 707/708
(58) Field of Classification Search ............ 705/26.1, 705/27.1
See application file for complete search history.

(56) References Cited

U.S. PATENT DOCUMENTS

| | | | |
|---|---|---|---|
| 7,610,219 B2* | 10/2009 | Sayed | 705/26.2 |
| 7,805,431 B2* | 9/2010 | Siegel | 707/708 |
| 2003/0083982 A1 | 5/2003 | Fisher et al. | |
| 2007/0078884 A1* | 4/2007 | Ott et al. | 707/102 |
| 2007/0226077 A1* | 9/2007 | Frank et al. | 705/27 |

FOREIGN PATENT DOCUMENTS

KR   1020010106868 A   12/2001
KR   1020020015222 A   2/2002

* cited by examiner

Primary Examiner — Yogesh C Garg
(74) Attorney, Agent, or Firm — Lando & Anastasi, LLP

(57) ABSTRACT

System and method for dynamically categorizing a plurality of products listed for sale with an Internet-based shopping site based on tags associated with the products. Sellers submit one or more tags or categories when they list new products with the site. Categories and/or subcategories may be generated based, at least in part, on a frequency of the tags associated with the plurality of products listed with the site. Shoppers may search for products based on the generated categories and/or subcategories. The categories and/or subcategories may be maintained as the products listed for sale with the site change to maintain up to date category and/or subcategories.

52 Claims, 13 Drawing Sheets

301

| Tag ID | Tag Name |
|---|---|
| 0 | History |
| 1 | Modern |
| 2 | Cute |
| 3 | Jeans |
| 4 | Purse |
| 5 | Jewelry |
| 6 | Shirt |
| 7 | Painting |
| 8 | French |
| 9 | Fiction |
| 10 | Pants |

303

| Category ID | Category Name |
|---|---|
| 0 | Book |
| 1 | Art |
| 2 | Accessories |
| 3 | Clothing |

305

| Category ID | Tag ID |
|---|---|
| 0 | 0 |
| 0 | 9 |
| 1 | 1 |
| 1 | 7 |
| 2 | 4 |
| 2 | 5 |
| 3 | 10 |
| 3 | 3 |
| 3 | 6 |

307

| Listing ID | Category IDs | Tag IDs | Product Information |
|---|---|---|---|
| 1 | 0,1 | 0,1,7 | Art History Textbook For Sale For $50... |
| 2 | 3 | 2,10,3 | Pair of Jeans For Sale For $60... |

| Category ID | Path |
|---|---|
| 0 | Book |
| 1 | Book.History |
| 2 | Book.History.Art |
| 3 | Book.History.Art.Modern |
| 4 | Art |
| 5 | Art.Modern |
| 6 | Art.Painting |
| 7 | Clothing |
| 8 | Clothing.Pants |
| 9 | Clothing.Pants.Jeans |
| 10 | Clothing.Shirt |

*403*

| Listing ID | Tags | Product Information |
|---|---|---|
| 1 | Art.Book.History.Painting.Modern | Art History Textbook For Sale For $50... |
| 2 | Pants.Clothing.Jeans.Cute | Pair of Jeans For Sale For $60... |

FIG. 4

SYSTEM AND METHOD FOR DYNAMIC CATEGORIZATION

RELATED APPLICATION

This application claims priority under 35 U.S.C. §119(e) to U.S. Provisional Application No. 60/834,079, entitled "SYSTEM AND METHOD FOR DYNAMIC CATEGORIZATION," filed Jul. 28, 2006, which is hereby incorporated by reference in its entirety for all purposes.

BACKGROUND

1. Field of Invention

The present invention relates to Internet-based shopping and more particularly to shopping based on product categories and subcategories.

2. Discussion of Related Art

Internet-based shopping has grown into a major industry. Typical Internet-based shopping sites present a shopper with a wide variety of products when the shopper visits a shopping webpage. Within an interface associated with a typical Internet-based shopping site, the shopper (e.g., a user) chooses the products he or she wants to purchase and proceeds to pay for those products. Those products are then shipped to an address provided by the shopper.

Some Internet-based shopping sites are linked to a specific manufacturer or type of product and allow users to choose from only a limited array of products from that manufacturer of that type. Others are more general sites that allow users to select from a wide array of product types from a wide array of manufacturers. While some of these typical Internet-based shopping sites provide shoppers with a department store-like shopping experience where the sites present the shopper with the products of only large sellers or manufacturers, others provide shoppers with a more market-like shopping experience where the site presents the shopper with products from smaller or individual sellers or manufacturers. In any case, shoppers at Internet-based shopping sites are typically presented with a vast number of products from which to choose.

Some shoppers may be looking for a specific product, in which case, it is useful for a site to provide the shoppers with a tool for searching the vast number of products to find the specific product. If the user knows the name or model number, the Universal Product Code (UPC), or some other unique identifier for the specific item, a search function may search through the potential products for the one that matches that unique identifier.

In other instances, shoppers may only know a description of the product that may include a manufacturer name, name of the product type, or other descriptive terms for the product. Other shoppers may not have a specific product in mind when they visit the site, but rather they may be searching for a type of product. These shoppers may, for example, want to browse all products offered by a site or a subset of the products offered by a site to compare products of the specific type before they make a final purchase. In these cases, the search tool may allow the shopper to enter keywords to describe the product or type of product to search for products that match the entered keywords.

To facilitate such keyword searching, the site may associate each item with a plurality of keywords or descriptions. These keywords or descriptions are typically provided to the Internet-based shopping site by the seller or manufacturer of the item when the item is first listed by the site.

SUMMARY OF INVENTION

According to one aspect of the present invention, it is appreciated that one problem with conventional Internet-based shopping sites is that a shopper may not know a priori what keywords or descriptions are associated with the product or product type for which he or she is searching. Furthermore, each shopper, each Internet-based shopping site, and each manufacturer may describe the same or similar products differently. For example, a textbook that contains prints of modern paintings and a discussion of the history behind them may have a description of "art history book" associated with it. A shopper, however, may enter the search term "modern painting text." This search string may typically not return the textbook that the shopper wants.

In addition to a keyword search, a conventional Internet-based shopping site might divide its items into a plurality of categories (e.g., clothing, books, and electronics) and allow shoppers to search based on the categories. The site may provide the shopper with the list of categories so that the shopper can select to view only items in one or more of those categories. By presenting the shopper with this list of categories, the site effectively ensures uniformity in the description used by the shopper and the site. For example, the textbook described above may be placed in a "books" category. If the shopper is presented with a list of item categories consisting of "books", "clothing", and "electronics", since the textbook is clearly not clothing or electronics, the shopper may know to ask the site for a list of items in the "books" category to find the textbook.

For Internet-based shopping sites with a large number of products for sale, one level of categories may not provide sufficient resolution for effective searching. The items presented to a user when the user selects a category is ideally a small, easily browsable number of items. However, dividing a large number of potential items into categories may leave each category with too great a number of items to allow such easy browsing.

An Internet-based shopping site may further divide each category into a plurality of subcategories to provide a higher resolution category-based search tool. Further, just as the categories may not provide enough resolution for effective searching, so too may one level of subcategories also not provide enough resolution for effective searching if the number of potential items is great enough. Some Internet-based shopping sites may further subdivide each subcategory into a plurality of other subcategories. For example, the textbook from above may be placed in the broad category "book," the first level subcategory "art history book," and the second level subcategory "modern painting history book."

To facilitate category searching, conventional Internet-based shopping sites generally create a list of categories and subcategories for the product that may be sold by the site. The conventional Internet-based shopping sites then ask sellers to position their items in the appropriate categories and subcategories as they are listed with the site.

In accordance with one aspect of the present invention, it is appreciated that an Internet-based shopping site may not be correctly configured to list items in effective categories prior to receiving information about the products to be listed. More particularly, it is appreciated that creating a list of categories and subcategories that accurately describes the items that may be listed and that provides a sufficient level of search resolution for these items may be impossible before these items are received by the site.

Further, even after an initial set of items is known by the site and an initial list of categories and subcategories has been established, the types and numbers of items of each type that are listed with the site may change over time. These changes may leave some categories or subcategories too overpopulated to be useful and other categories underpopulated or unpopulated.

According to one aspect of the present invention, it is appreciated that it may be advantageous to provide a dynamic categorization system that may dynamically generate categories and/or subcategories based on the items that are currently listed for sale with an Internet-based shopping site. By periodically generating categories and/or subcategories and replacing items in the new category and subcategory list, the category and subcategory list may provide a more useful search tool than a static categorization system.

To facilitate the dynamic generation of categories and/or subcategories and placement of products in these dynamic categories and subcategories, each product may be associated with one or more tags entered by a person who listed the item for sale with the Internet-based shopping site. Each tag may provide a description of the product.

The dynamic categorization system may search the tags of all listed products and generate categories and/or subcategories based on the tags. For example, the dynamic categorization system may create general categories or subcategories for tags that are frequently used. More specific subcategories may be generated for tags that are less frequently used.

A product may be placed in a category if it is associated with the tag that is associated with the category. A product may be placed in a subcategory if it is associated with a tag that is associated with the subcategory and a tag that is associated with any other category or subcategory from which the subcategory descends. At some times when categories and subcategories are dynamically created, any products that are currently listed with the system may be placed in the newly generated categories and subcategories based on the tags associated with the products. When a seller lists a new item for sale with the site, the new item may be placed in whatever the then-current list of categories and subcategories according to tags entered by the seller with the item.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

In one aspect of the present invention, a method is described for selling a product. The method comprises acts of receiving at least one first tag describing the product, and associating the product with at least one of at least one first category from a list of potential categories and at least one first subcategory from a list of potential subcategories, based, at least in part, on the at least one first tag.

In one embodiment of the present invention, the method may further include acts of receiving at least one second category of the product; and associating the product with the at least one second category, wherein associating the product with at least one of at least one first category from a list of potential categories and at least one first subcategory from a list of potential subcategories, based, at least in part, on the at least one first tag comprises an act of associating the product with at least one subcategory based, at least in part, on the at least one first tag.

In one embodiment, the at least one second category is selectable from a predefined category list. In another embodiment, a user selects the at least one second category from the predefined category list before receiving at least one second category of the product.

In one embodiment, the at least one first tag is selectable from a predefined tag list. In another embodiment, a user selects the at least one first tag from the predefined tag list before receiving at least one first tag describing the product.

In one embodiment, each tag of the predefined tag list is associated with at least one of the potential categories and the potential subcategories. In another embodiment, each tag of the at least one first tag includes at least one keyword describing the product.

In one embodiment of the present invention, the method further comprises an act of limiting the at least one first tag to a maximum number of first tags.

In one embodiment of the present invention, the method further comprising an act of suggesting at least one second tag based, at least in part, on the at least one first tag. In one embodiment, the at least one second tag is associated with a plurality of previously submitted products that are also associated with the at least one first tag. In another embodiment, the at least one second tag is associated with at least one of a second category and a second subcategory that hierarchically relates to the at least one of the first category and first subcategory. In a further embodiment, the at least one of the group comprising the second category and second subcategory includes at least one of a parent category, a parent subcategory, and a child subcategory of the at least one of the first category and first subcategory.

In one embodiment, each potential category and potential subcategory is associated with at least one of a plurality of second tags. In another embodiment, the plurality of second tags includes the at least one first tag and the act of associating the product with at least one of at least one first category from a list of potential categories and at least one first subcategory from a list of potential subcategories, based, at least in part, on the at least one first tag comprises an act of associating the product with the at least one first category from the list of potential categories that is associated with the at least one first tag.

In one embodiment, each potential subcategory is hierarchically related to at least one potential category. In another embodiment, a second tag associated with at least one first potential subcategory that is hierarchically related to a first potential category is also associated with at least one second potential subcategory that is hierarchically related to a different second potential category. In a further embodiment, at least one first potential subcategory is hierarchically related to at least one second potential subcategory.

In one embodiment, the act of associating the product with at least one of at least one first category from a list of potential categories and at least one first subcategory from a list of potential subcategories, based, at least in part, on the at least one first tag comprises an act of associating the product with the at least one first subcategory from the list of potential subcategories that is associated with the at least one first tag and that hierarchically descends from at least one of a second potential category and a second potential subcategory associated with the at least one first tag.

In one embodiment, at least one of the list of potential categories and the list of potential subcategories is based, at least in part, on a plurality of tags describing a plurality of previously submitted products. In another embodiment, at least one of the list of potential categories and the list of potential subcategories is based, at least in part, on a frequency of tags in the plurality of tags.

In one embodiment of the present invention, the method includes an act of receiving at least one second category of the product responding to a request that identifies at least one of at least one second category and at least one second subcategory with a representation of submitted products, including the first product and other previously submitted products, associated with the at least one of at least one second category and at least one second subcategory, respectively. In one embodiment, a user submits the request prior to receiving at least one second category of the product.

In one embodiment of the present invention, the method includes an act of maintaining at least one of the list of potential categories and the list of potential subcategories, based at least in part on a plurality of other tags associated with a plurality of previously submitted products, wherein that list of potential categories and the list of potential subcategories includes the at least one first category and the at least one first subcategory, respectively. In one embodiment, the act of maintaining at least one of the list of potential categories and the list of potential subcategories includes updating at least one of the list of potential categories and the list of potential subcategories based, at least in part on at least one first change to the plurality of previously submitted products. In another embodiment, the plurality of previously submitted products were previously submitted by a plurality of users and the at least one first change includes at least one second change made by at least one of the plurality of users.

In one embodiment, the at least one first change includes a threshold number of changes and the act of maintaining at least one of the list of potential categories and the list of potential subcategories includes updating the at least one of the list of potential categories and the list of potential subcategories after the threshold number of changes to the previously submitted products. In another embodiment, the act of maintaining at least one of the list of potential categories and the list of potential subcategories includes periodically updating the at least one of the list of potential categories and the list of potential subcategories.

In a further aspect of the invention, a system is described for managing products for sale, the system comprising a category component configured to maintain a list of potential categories and potential subcategories; a submission component configured to accept submission of at least one first product and at least one first tag describing the at least one first product and to associate the at least one first product with at least one of a first category and a first subcategory of the list from potential categories and potential subcategories, based, at least in part, on the at least one first tag.

In one embodiment, the submission component is further configured to accept submission of at least one second category and to associate the at least one first product with the at least one second category.

In another embodiment, the at least one first tag is selectable from a predefined tag list. In another embodiment, the submission component is adapted to accept the submission of the at least one first product from a user. In a further embodiment, each tag of the predefined tag list is associated with at least one of the potential categories and potential subcategories. In one embodiment, the at least one first tag includes at least one keyword describing the product.

In one embodiment of the present invention, the submission component is further configured to suggest at least one second tag based, at least in part, on the at least one first tag. In one embodiment, the at least one second tag is associated with a plurality of previously submitted products that are also associated with the at least one first tag. In another embodiment, the at least one second tag is associated with at least one of a second category and a subcategory that is hierarchically related to the at least one of the first category and first subcategory.

In one embodiment, the category component is further configured to associate each potential category and potential subcategory with at least one previously entered tag. In one embodiment, the category component is configured to associate the first product with the at least one first category if the at least one first category is associated with the at least one first tag. In another embodiment, the category component is further configured to maintain the list of potential categories and potential subcategories in at least one tree structure, such that each potential subcategory is hierarchically related to at least one potential category.

In one embodiment of the present invention, a second tag associated with at least one first potential subcategory that is hierarchically related to a first potential category is also associated with at least one second potential subcategory that is hierarchically related to a different second potential category. In one embodiment, at least one first potential subcategory is hierarchically related to at least one second potential subcategory. In another embodiment, the category component is configured to associate the at least one first product with the at least one first subcategory from the list of potential subcategories if the first subcategory is both associated with the at least one first tag and hierarchically descends from at least one of a second potential category and a second potential subcategory associated with the at least one first tag.

In one embodiment of the present invention, the category component is further configured to maintain at least one of the list of potential categories and the list of potential subcategories based, at least in part, on a plurality of tags associated with a plurality of previously submitted products. In one embodiment, the category component is further configured to update at least one of the list of potential categories and the list of potential subcategories based, at least in part, on at least one first change to the previously submitted products. In another embodiment, the category component is further configured to periodically update at least one of the list of potential categories and the list of potential subcategories. In a further embodiment, the at least one first change includes a threshold number of first changes, and the category component is further configured to update the at least one of the list of potential categories and the list of potential subcategories after the threshold number of changes to the previously submitted products. In one embodiment, the category component is further configured to maintain at least one of the list of potential categories and the list of potential subcategories based, at least in part, on a frequency of tags in the plurality of tags.

In one embodiment, the system further comprises a search component configured to search the at least one first product and a plurality of other products previously submitted to the system based, at least in part, on one of at the least one first category and at least one first subcategory. In one embodiment, the search component is further configured to accept a search request identifying at least one of the at least one first category and at least one first subcategory and respond with a representation of all products from the at least one first product and the plurality of other products that are associated with the at least one of the at least one first category and at least one first subcategory. In another embodiment, the search component is adapted to accept the search request from a user.

In one embodiment, the system comprises at least one storage component configured to store at least one first representation of the at least one first product and at least one second representation of the list of potential categories and potential subcategories in at least one database table.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

FIG. 3 shows a set of example tables stored in a database according to one embodiment of the present invention;

FIG. 4 shows a set of example tables stored in a database according to another embodiment of the present invention;

DETAILED DESCRIPTION

Figure 1:
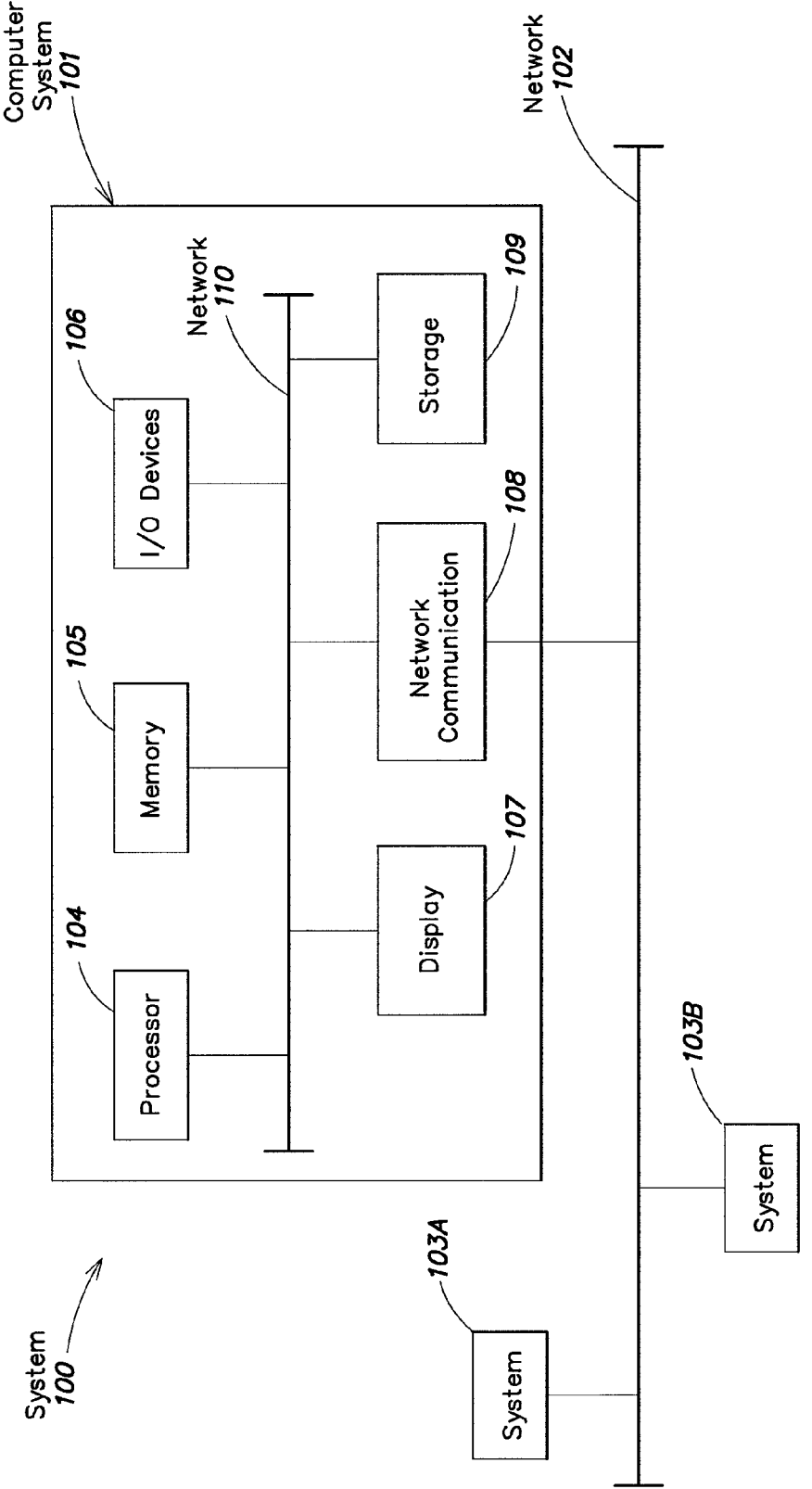
FIG. 1 shows an example computer system upon which various aspects of the present invention may be implemented.

This invention is not limited in its application to the details of construction and the arrangement of components and acts set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The present invention relates generally to dynamically categorizing products sold by an Internet-based shopping site. By so categorizing items, more effective categories and subcategories may be generated to aid shoppers in their search through the products offered by the Internet-based shopping site. The categories and subcategories may evolve over time as the products listed with the Internet-based shopping site change so that the categories and subcategories properly reflect a relatively current selection of listed products.

One aspect of the present invention relates to generating at least one of a plurality of categories and a plurality of subcategories based on tags describing a plurality of products listed for sale with the Internet-based shopping site. In some embodiments, each category and/or subcategory may be associated with a tag that defines the category or subcategory.

One or more tags may be associated with each product that is listed for sale with the Internet-based shopping site. Each product may then be associated with the categories and/or subcategories whenever the tags associated with the product match the tag defining the category and/or subcategory. For some embodiments in which subcategories and categories are generated based on tags, the product may be placed in a subcategory only if the tags associated with the product match the tags of the subcategory and any category or other subcategory from which the subcategory descends.

Shoppers, in some embodiments, may search for products listed with the Internet-based shopping site based on the categories and/or subcategories. Shoppers may obtain product information and purchase products from the Internet-based shopping site after performing such a category or subcategory based search.

A tag may include a keyword that describes the product with which it is associated. Each tag may have more than one keyword associated with it (e.g., a multiple word tag). Such tags using multiple keywords may include, for example, one or more keywords presented in a particular format. In one example using a multiple word tag, keywords may be separated by one or more spaces (e.g., "household pet"), other types of characters (e.g., "books:fiction"), or no character (e.g., "newyorkyankees"). It should be appreciated that tags may have any type of formatting, and the invention is not limited to single-word tags.

In some implementations, derivative and synonymous tags may be treated as the same tag. For example, the tag "Book" and the tag "Books" may be treated as a single tag because "Books" is a plural derivative of "Book." As another example, the tag "Book" and the tag "Text" may be treated as a single tag because "Book" and "Text" are synonymous. By treating such tags as one tag, deviations in the entry and formatting of tags from one seller to another may still result in similar items being properly associated with similar tags. The site administrator of the Internet-based shopping site may determine which tags are synonyms and derivatives of each other.

The tags associated with each product may be entered by the seller of the product at the time the product is listed with the Internet-based shopping site. In some implementations of an Internet-based shopping site in accordance with the present invention, the tags associated with a product may be updated after the product is listed for sale with the Internet-based shopping site. Some implementations may allow only the seller of the product to update the tags. Other implementations may allow additional users to update the tags (e.g., authorized users, site administrators, every user).

The Internet-based shopping site may store the information in one or more databases (e.g., object, relational, or other database type). Alternatively or in addition to traditional databases, information may be stored in any other database format such as flat-file or other data structure file format (e.g., extensible markup language (XML)). Whenever updates or access to the information is needed, the system may reference or update the stored information as is appropriate.

The system may be configured to display an interface to a shopper allowing the shopper to search for products by category and purchase desired products. In some embodiments, the interface may be a graphical user interface (GUI) such as a website accessible with a standard web browser. A similar GUI may be accessible to product sellers to allow sellers to list new products with the Internet-based shopping site.

General Purpose Computer System

Various aspects of the present invention may be implemented on one or more computer systems. These computer systems may include, for example, general-purpose computers such as those based on Intel PENTIUM-type processor; Motorola PowerPC; AMD Athlon, Turion or Opteron; Sun UltraSPARC; Hewlett-Packard PA-RISC processors; or any other type of processor. The system may be located on a single computer or may be distributed among a plurality of computers attached by a communication network.

A general-purpose computer system according to one embodiment of the invention is configured to perform any of the described functions, including but not limited to, storing, editing, categorizing, and retrieving information. It should be appreciated that the system may perform other functions, including other acts of managing information, sharing information, formatting information, communicating with banks or credit card providers, etc., and the invention is not limited to having any particular function or set of functions.

FIG. 1 illustrates a block diagram of a general purpose computer and network system in which various aspects of the present invention may be practiced. For example, various aspects of the invention may be implemented as specialized software executing in one or more computer systems including general-purpose computer system 101 shown in FIG. 1. Computer system 101 may include a general-purpose computer system that is programmable using a high-level computer programming language. Computer system 101 may be also implemented using specially programmed, special purpose hardware. In computer system 101, one or more processors 104 are typically a commercially available processor such as the well-known Pentium class processor available from the Intel Corporation or the well-known Opteron class processor available from AMD Corporation. Many other processors are available. Such a processor usually executes an operating system which may include, for example, the Windows-based operating systems (e.g., Windows NT, Windows 2000 (Windows ME), Windows XP operating systems) available from the Microsoft Corporation, MAC OS System X operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the invention is not limited to any particular operating system.

The processor and operating system together define a computer platform for which application programs in high-level programming languages are written. It should be understood that the invention is not limited to a particular computer system platform, processor, operating system, or network. Further, it should be appreciated that other appropriate programming languages and other appropriate computer systems could also be used.

Various embodiments of the present invention may be programmed using an object-oriented programming language, such as SmallTalk, Java, C++, Ada, Python, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a GUI or perform other functions). Various aspects of the invention may be implemented as programmed or non-programmed elements, or any combination thereof.

Computer system 101 may also include one or more memory devices 105, such as a disk drive, memory, or other device for storing data, connected to the processor 104. Memory 105 is typically used for storing programs and data during operation of the computer system 101. Components of computer system 101 may be coupled by an interconnection mechanism such as network 110, which may include one or more busses (e.g., between components that are integrated within a same machine) and/or a network (e.g., between components that reside on separate discrete machines). The interconnection mechanism enables communications (e.g., data, instructions) to be exchanged between system components of computer system 101.

Computer system 101 may also include one or more input/output (I/O) devices 106, for example, a keyboard, mouse, trackball, microphone, touch screen, a printing device, display screen, speaker, etc. In addition, computer system 101 may contain one or more interfaces (e.g., network communication device 108) that connect computer system 101 to a communication network (in addition or as an alternative to the network 110).

The computer system 101 may include one or more storage systems 109. The storage system 109, typically includes a computer readable and writeable nonvolatile recording medium in which signals are stored that define a program to be executed by the processor or information stored on or in the medium to be processed by the program. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). The memory may be located in storage system 109, as shown, or in memory system 105. The processor 104 generally manipulates the data within the integrated circuit memory 104, and then copies the data to the medium associated with storage 109 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 101 is shown by way of example as one type of computer system upon which various aspects of the invention may be practiced, it should be appreciated that aspects of the invention are not limited to being implemented on the computer system as shown in FIG. 1. Various aspects of the invention may be practiced on one or more computers having a different architectures or components than that shown in FIG. 1.

Specifically, one or more portions of the computer system may be distributed across one or more computer systems coupled to the communications network such as computer systems 103A and 103B. These computer systems also may include general-purpose computer systems. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Example System Architecture

Figure 2:
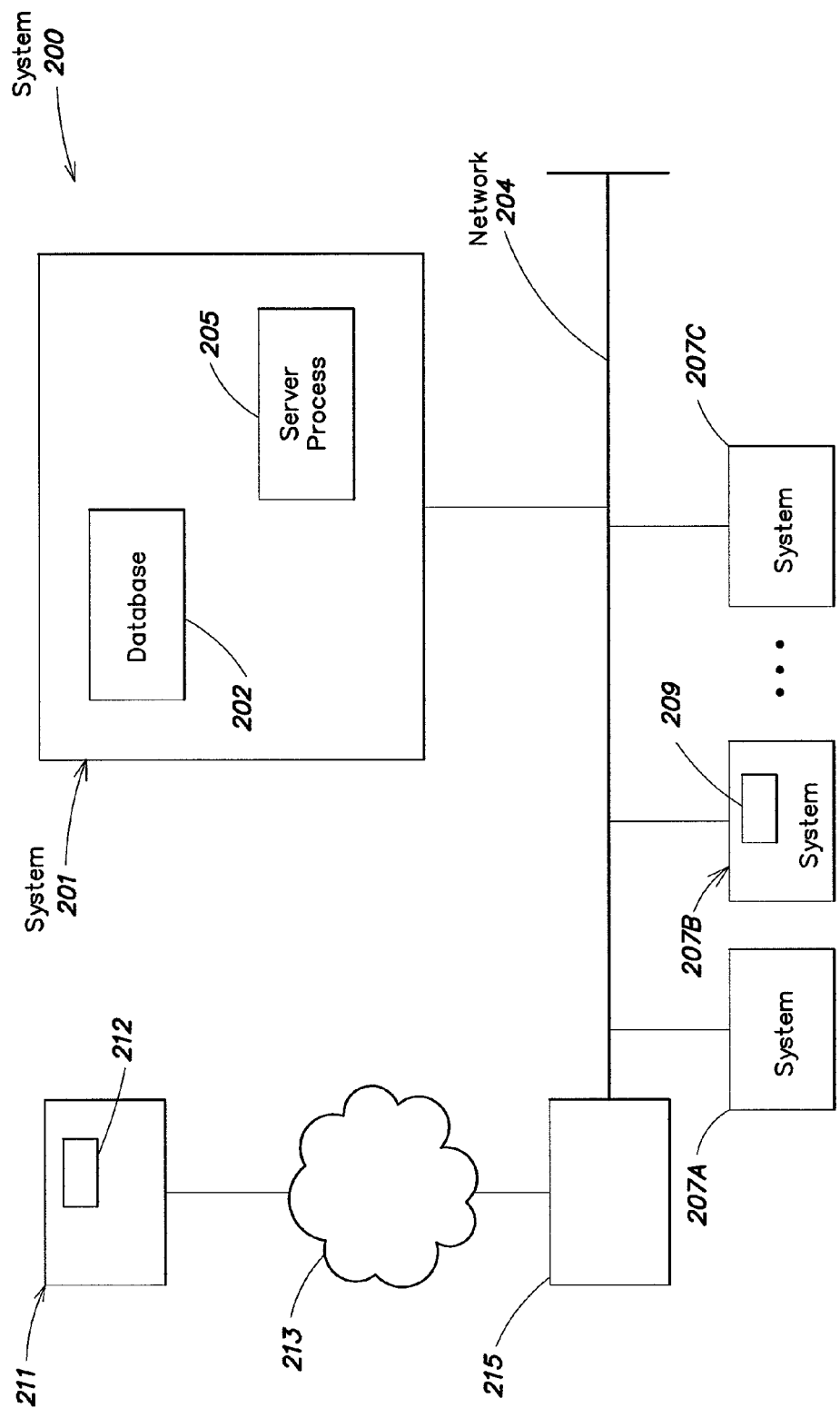
FIG. 2 shows an example system architecture according to one embodiment of the present invention.

FIG. 2 illustrates an architecture diagram of an example system according to one embodiment of the invention. It should be appreciated that FIG. 2 is used for illustration purposes only, and that other architectures may be used to facilitate one or more aspects of the present invention.

As shown in FIG. 2, a distributed system 200 may be used to submit, maintain, and search category and tag information. System 200 may include one or more computer systems (e.g., systems 201, 208A-D) coupled by a communication network 204. Such computer systems may include, for example, general-purpose computer systems as discussed above with reference to FIG. 1.

In a system practiced on a plurality of computer systems, each computer system may be configured to perform a specific function for the system. For example, in one embodiment of the present invention, system 201 is a database server that stores tag and category information in one or more databases (e.g., database 202). Further, system 201 performs associated functions with the tag information such as search and update functions.

System 201 may include a server process (e.g., process 205) that responds to requests from one or more client programs. Process 205 may include, for example, a structured query language (SQL) server or other server-based process that interfaces to one or more client programs distributed among the other systems (e.g., systems 207A-207D).

In some implementations, other computer systems, in addition to system 201, may also act as database servers. Such computer systems, including system 201, may be configured to execute a well-known database management program such as Microsoft's SQL server software, or an open source database manger such as PostgreSQL database manager. These database servers may be configured to respond to database access and update request from other computer systems. In some implementations, one database server may be configured as a master database server that distributes database requests to other database servers in order to maximize the speed of responding to database requests. In some implementations, the master database server may be configured to respond to database update requests and maintain an updated copy of the database on all other database servers. Each of the other database servers may be configured to respond only to database read or search requests.

Other server based processes 205 being executed by the other computer systems, may include a web server process, an XML server process, peer-to-peer process, a domain name server process, a routing server process, etc. In the case of a web server process 209, the computer system executing the process may be configured to accept incoming hypertext transfer protocol (HTTP) requests from a user of the Internet-based shopping site, for example through a web browser 212 being executed on a remote computer system 211 operated by the user.

Web browser 212 may direct requests through the Internet 213 to an edge routing device 215 that is associated with the Internet-based shopping site. Edge routing device 215 may direct the request to the web server 212 through the network 204. Web server process 209 may respond to the request by providing the requested information. In some instances, web server process 209 may communicate with other computer systems to respond to the request. For example, web server process 209 may receive a request that requires an SQL database query or other database query. In that instance, web server 212 may convert the received HTTP request into an SQL or other database query for an SQL or other database server. Web server 212 may transmit the SQL or other database request to the SQL or other database server and, after receiving a response from the database server, respond to the initial HTTP request.

According to one embodiment, a program executed by one of the computer systems may be capable of creating dynamic categories and/or subcategories based on the tags associated with the products listed for sale with the Internet-based shopping site. Such a program may include any type of application capable of communicating with the other computer systems of the system 200 through network 204 either directly or indirectly. For example, the client program may query the database servers for specific information regarding frequency of tag use, and generate updated category and/or subcategory information based on this information as described below. The client program may then provide the updated category and/or subcategory to the database system which, in turn, updates the stored database information in accordance with the new category/subcategory information.

Example Database Information

In various aspects of the present invention, information regarding categories, subcategories, products, and tags may be stored on one or more storage devices. The storage devices may be associated with and managed by one or more database servers, as described above. The information may be stored and arranged in one or more database tables.

FIG. 3 illustrates a set of exemplary database tables for an Internet-base shopping site in accordance with one embodiment of the present invention in which a maximum of one level of subcategories is associated with any category. The set of tables includes a tag table 301, a category table 303, a subcategory table 305 and a listing table 307.

The tag table 301 includes one entry for each tag recognized by the Internet-based shopping system. Any tag that has ever been or is currently associated with a product listed with the site may be included in the tag table 301. In one embodiment, the list of tags may be static. In another embodiment, the list of tags may be changed slowly by a site administrator. The list may grow over time automatically as users enter new tags, so that each new tag receives a new entry in tag table 301. An entry for a tag includes a unique tag ID and a tag name identifying the tag. For example, tag ID 0 in tag table 301 corresponds to a "History" tag. Each tag in this arrangement may be referred to by its unique tag ID.

According to one embodiment, the category table 303 may include one entry for each category recognized by the Internet-based shopping system. In some implementations, these categories may be dynamically generated, as discussed below. In other implementations, these categories may be static. In still other implementations, these categories may be updated periodically by a site administrator. In the illustrated implementation, each entry for a category includes a unique category ID and a category name identifying the category. For example, category ID 0 in category table 303 corresponds to a "Book" category.

According to one embodiment, subcategory table 305 may include one entry for each subcategory recognized by the Internet-based shopping system. In some implementations, the subcategories are dynamically generated based on the tags associated with the products listed with the site. An exemplary generation process is described in more detail below.

According to one embodiment, each entry in subcategory table 305 corresponds to one subcategory of one category from category table 303. In one embodiment, each entry in subcategory table 305 may include a category ID identifying the category from which the subcategory descends and a tag ID identifying the tag that defines the subcategory. For example, the first entry of the subcategory table 305 indicates that the "Book" category (identified by the category ID 0) has a subcategory that is defined by the tag ID 0, which corresponds to the tag "History." In this example, the subcategory "History" of the category "Book" may include any products associated with both the category "Book" and the tag "History."

According to one embodiment, listing table 307 may include one entry for each product listed with the Internet-based shopping site. Some information contained in these entries may be submitted by users of the system, especially the seller of the product in a process similar to one described in more detail below.

According to one embodiment, each entry for a product in listing table 307 may include a unique listing ID that may be used to identify the listing. Each entry also may include a listing of tag IDs, a listing of category IDs, and a collection of other product information. In one embodiment, the tag IDs correspond to tags in tag table 301. For example, listing ID 1 may be associated with tag IDs 0, 1, and 7 which correspond to tags "History," "Modem," and "Painting," respectively. In some implementations, the order of the tags may correspond to alphabetical order, tag scope, numerical order by tag ID, or some other ordering that may improve the speed of searching through the listing of tags.

In one embodiment, category IDs may correspond to categories in the category table 303. Each listing may be associated with one or more categories. For example, listing ID 1 may be associated with the "Book" category and the "Art" category. The product information for each entry may include any information the Internet-based sopping site uses to sell or advertise the product (e.g., price information, product narrative, seller information, product images, etc.).

The illustrated collection of database tables in FIG. 3, for example, allows a search to be easily performed for products within a category or subcategory and for tags associated with the products. For instance, a search for products within the "History" subcategory of the "Book" category may search listing table 307 for any entries containing a tag ID 0 in the tag IDs portion of the listing and a category ID 0 in the category IDs portion of the listing. A search for particular tags, such as to determine a frequency of a particular tag may be performed by traversing the entries in listing table 307 and counting each appearance of each tag.

FIG. 4 illustrates another set of exemplary database table for an Internet-based shopping site in accordance with another embodiment of the present invention in which a category may have many levels of subcategories. The set of tables may include, for example, a category table 401 and a listing table 403.

In one embodiment, the category table 401 may include one entry for each category and subcategory. In one embodiment, each entry may contain a path and category ID that identifies the category or subcategory. For example, category ID 0 may correspond to the category "Book." The path element of each listing contains an ordered list that begins with a broadest category and proceeds to narrower subcategories, which are each separated, in this implementation, by a period.

In some implementations, the path variable may be stored as an ordered list, or a tree structure, such as an ltree. For example, category ID 2, having path "Book.History.Art," corresponds to the "Art" subcategory of the "History" subcategory of the "Book" category." The names defining the categories and subcategories correspond to tags entered into the system. For example, the "Book" category corresponds to a "Book" and the "History" subcategory corresponds to a "History" tag.

In one embodiment, listing table 403 may include one entry for each product listed for sale with the Internet-based shopping site. In one implementation, the information contained in these listings may be submitted by users of the Internet-based shopping site, especially the seller of the product in a process similar to one described in more detail below.

In one embodiment, listing table 403 may include a unique listing ID for each entry that may be used to identify the listing. Each entry may also include a listing of tags and a collection of other product information. In some implementations, the order of the tags may correspond to alphabetical order, tag scope or some other ordering that may improve the speed of searching through the listing of tags. The product information for each entry may include any information the Internet-based shopping site may use to sell or advertise the product (e.g., price information, product narrative, seller information, product images, etc.).

The illustrated collection of database tables in FIG. 4, for example, allows a search to be easily performed for products within a category or subcategory and for tags associated with the products. For instance, a search for products within the "History" subcategory of the "Book" category may search listing table 403 for any entries containing a tag "History" and a tag "Book" in the tags portion of the listing. A search for particular tags, such as to determine a frequency of a particular tag, may be performed by traversing the entries in listing table 403 and counting each appearance of each tag.

In other embodiments, category and listing information may be stored and arranged in a tree structure. Such embodiments may arrange each root of a tree as a category and include a link to each product associated with that category. Each root may include a link to one or more subcategory nodes. Each subcategory node may include a link to each product associated with the subcategory and may include links to further subcategory nodes. By traversing the tree, a shopper may search through the chain of categories and subcategories to a desired level.

As described below, the information in the example tables or other information stored by the Internet-based shopping site may be used to dynamically generate and maintain categories or subcategories based on tags associated with listed products in accordance with one aspect of the present invention. As discussed above, generating and maintaining such categories and subcategories may improve the ability of a shopper to search for products listed with the Internet-based shopping site.

Example Processes

Figure 5:
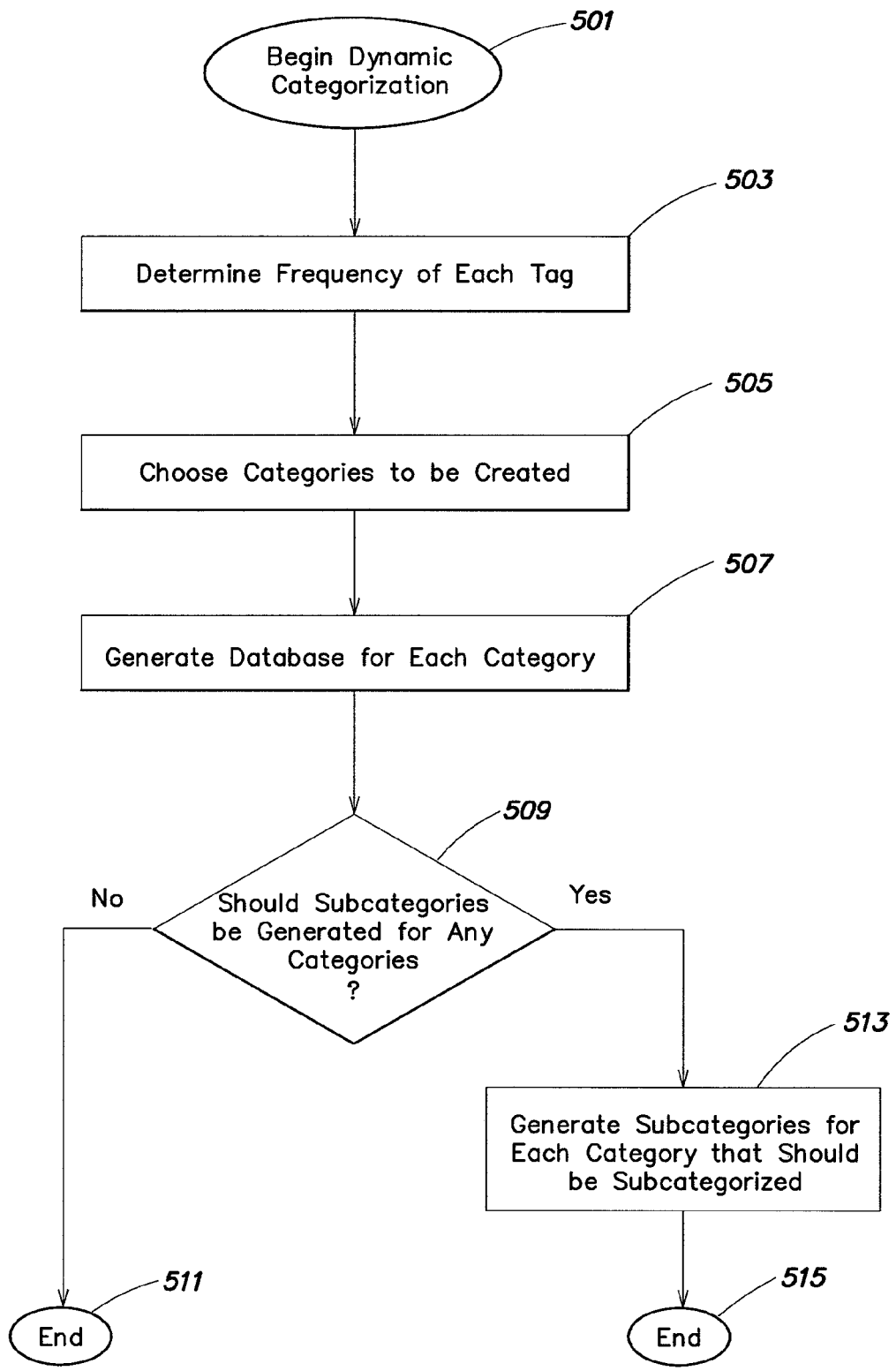
FIG. 5 shows an example process for creating dynamic categories according to one embodiment of the present invention.

An example process that may be performed by an Internet-based shopping site to generate categories in accordance with one aspect of the present invention is illustrated in FIG. 5, and begins at block 501. Such a process may be performed by an Internet-based shopping site that generates dynamic categories. This process may be performed periodically or whenever a new product is submitted for listing with the Internet-based shopping site, an old product is removed from listing, periodically such as after a time period determined by a site administrator, or some combination thereof. Some Internet-based shopping sites in accordance with the principles of the present invention may not generate categories dynamically, but rather they may dynamically generate subcategories of otherwise static categories (e.g., categories that are updated manually by a site administrator only after relatively long periods).

By performing the illustrated process or some other process to dynamically generate categories and/or subcategories, the Internet-based shopping site may improve the effectiveness of any search tools that allow shoppers to search the site based on categories and/or subcategories.

In one embodiment, as indicated in block 503 of FIG. 5, the Internet-based shopping site may determine the frequency of each tag associated with the products listed for sale with the Internet-based shopping site. As described above with respect to the example database tables, this step may be performed by traversing a database table and recording the frequency of each tag. For example, the site may examine the tags to determine the number of times the tags "art," "history," "book," "electronics," and "clothing" are each associated with one of the plurality of products.

In one embodiment, based, at least in part, on the frequency of the tags, the Internet-based shopping site may choose which categories to create, as indicated in block 505 of FIG. 5. For example, the site may choose a first number of tags having a highest frequency and generate a first number of categories that correspond to the first number of tags. Each chosen category may correspond to one tag. The number of categories may be a fixed number determined by the site administrator of the Internet-based shopping site or a changing number based, at least in part on the number of products listed with the site so that as the number of listed products increases, the number of categories may increase as well (e.g., the site may maintain one category per thousand listed products).

In some embodiments, the frequency may not be the sole criteria used to choose categories. Some tags may not provide shoppers with useful descriptions of products associated with those tags. For example, the tag "cute" may be associated with a wide range of products that have little in common, such a clothing, electronics, furniture, etc. Creating a category associated with the tag "cute" may be useless to a shopper. The Internet-based shopping site may ignore these tags or discount them so that a category is unlikely to be generated based on such tags. In some implementations, the site administrator of the Internet-based shopping site may determine which tags to ignore or how much to discount tags. In other embodiments, all tags may be initially given full weight, and shoppers or sellers using the Internet-based shopping site may alter the discounting of each tag by voting on the usefulness of the tag.

In some embodiments, after choosing the categories to generate, the Internet-based shopping site may then generate the categories, as indicated by block 507 of FIG. 5. In one embodiment, the categories may be created by generating appropriate entries in category table 403 illustrated in FIG. 4. For example, the "Book" category may be created by generating an entry such as the entry corresponding to the category ID "0" and the category path "Book."

In the database implementation illustrated in FIG. 4, no additional act may be necessary to place the listed products in the newly generated categories. Rather, the Internet-based shopping site may determine which products are in which categories by referencing the appropriate tables, as described above. In some implementations, however, the Internet-based shopping site may perform an additional act of placing the listed products in the newly generated categories. For example, such implementations may include a database portion for each category entry that lists the products in the respective category. Such a portion, may list the listing IDs of each product in the category so that the Internet-based shopping site may reference listing table 403 to determine other information regarding the products. Such an act may be used, for example, to improve the speed of searching for products within a category.

Some embodiments of the present invention may include an act of generating subcategories for some categories, as indicated by block 513 of FIG. 5. In one example, a decision of whether or not to generate subcategories may be made automatically by a process running on a computer system associated with the Internet-based shopping site as indicated at block 509. In another embodiment, the decision of whether or not to generate subcategories for a category may be made by the site administrator. In one example, the decision may be made independently for each category based on the number of products within the category. In yet another example, the decision may be uniform for all categories based on the number of total products listed or some input from the site administrator indicating a number of levels of subcategories to generate. Process 500 may end at one of blocks 511 or 515.

Figure 6:
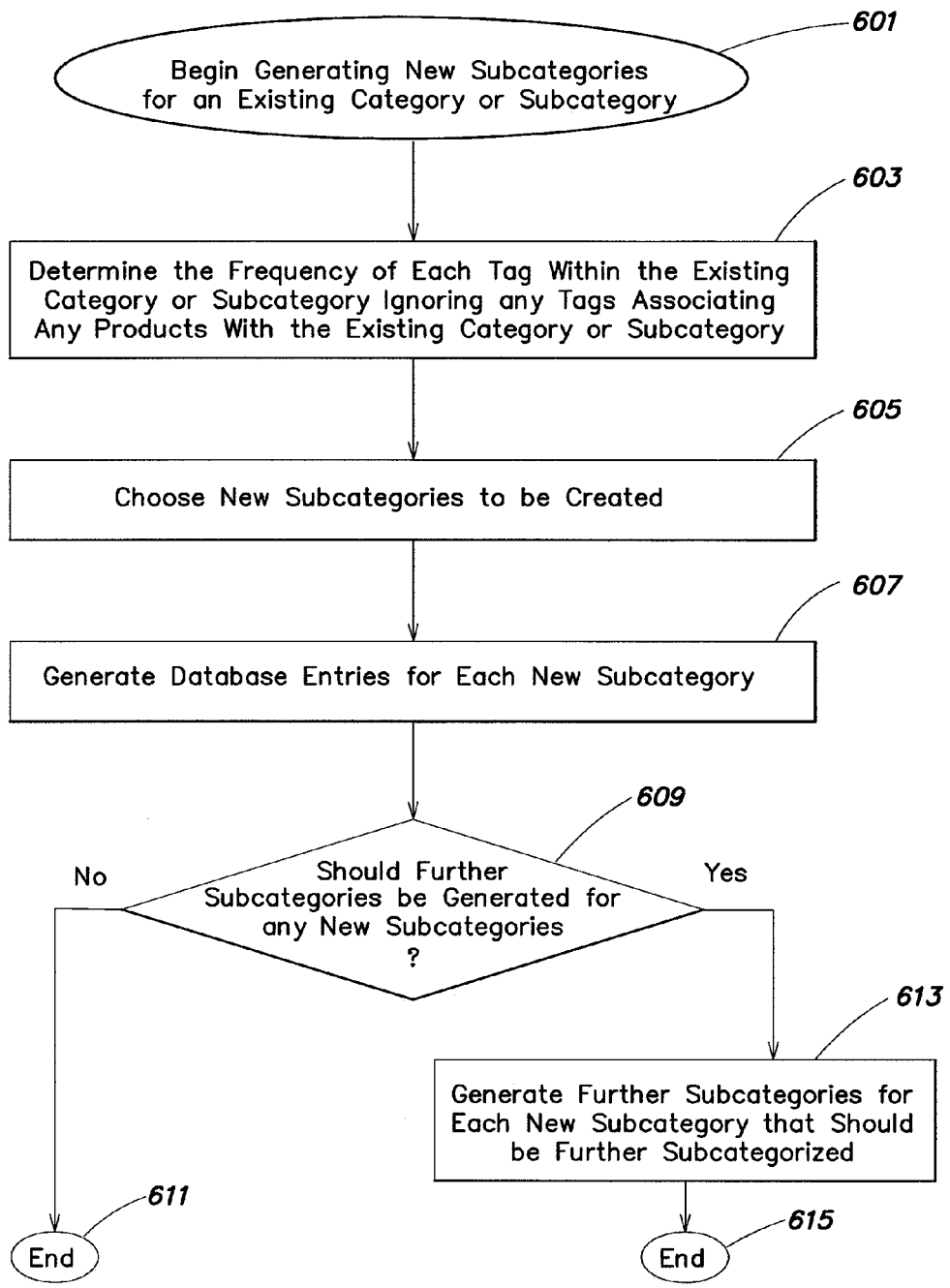
FIG. 6 shows an example process for creating dynamic subcategories according to one embodiment of the present invention.

An example process that may be performed by an Internet-based shopping site to generate subcategories of a given category in accordance with one aspect of the present invention is illustrated in FIG. 6 and begins at block 601. Such a process may be performed by any Internet-based shopping site that generates dynamic subcategories for every category for which subcategories should be generated. In some implementations, this process may be performed periodically. In some implementations, this process may be performed whenever a new product is submitted for listing with the Internet-based shopping site or an old product is removed from listing. In still other implementations, this process may be performed after a time period determined by the site administrator. Some Internet-based shopping sites in accordance with the principles of the present invention may not generate any subcategories, but rather they may only generate categories dynamically.

In one embodiment, as indicated in block 603 of FIG. 6, the Internet-based shopping site may determine the frequency of each tag associated with the products listed for sale with the Internet-based shopping site in the category. According to one embodiment, the Internet-based shopping site may ignore any tags used to place the product in the category because such tags may be the most frequent in each category and may lead to subcategories having the same name and products as their parent categories.

In one embodiment, based, at least in part, on the frequency of the tags, the Internet-based shopping site may then choose which subcategories to create, as indicated in block 605 of FIG. 6. For example, the site may choose a first number of tags having a highest frequency and may generate a first number of subcategories that correspond to the first number of tags. Each chosen subcategory may correspond to one tag. According to one embodiment, the number of subcategories may be a fixed number determined by the site administrator of the Internet-based shopping site. According to another embodiment, the number of subcategories may be a changing number based, at least in part on the number of products listed with the site or listed within the category so that as the number of listed products increases, the number of subcategories may increase as well.

In some embodiments, as discussed above, the frequency may not be the sole criteria used to choose categories. Rather, some tags may be ignored or discounted as described above with reference to FIG. 5.

After choosing the subcategories to generate, the Internet-based shopping site may then generate the subcategories, as is indicated by block 607 of FIG. 6. In one embodiment, the subcategories may be generated by creating appropriate entries in the subcategory table 305 illustrated in FIG. 3. For example, the "History" subcategory of the "Book" category may be created by generating an entry such as the entry corresponding to the category ID "0" and the tag ID "0," which in turn corresponds to the tag "History" in tag table 301. In another embodiment, the subcategories may be created by generating appropriate entries in category table 401 illustrated in FIG. 4. For example, the "History" subcategory of the "Book" category may be created by generating an entry such as the entry corresponding to the category ID "1" and the category path "Book.History." Because "History" appears directly after "Book" in this path, "History" is a direct subcategory of "Book."

In the database implementations illustrated in FIGS. 3 and 4, no additional act may be necessary to place the listed products in the newly generated subcategories. Rather, the Internet-based shopping site may determine which products are in which subcategories by referencing the appropriate tables, as described above. In some implementations, however, the Internet-based shopping site may perform an additional act of placing the listed products in the newly generated subcategories, as described above in connection to generating categories.

Some embodiments of the present invention may be configured to further subcategorize some subcategories, as indicated by block 613 of FIG. 6. A process or person may make a decision about whether such further subcategories should be generated, as indicated at block 609. Those subcategories may themselves be further subcategorized in a substantially similar process. In one embodiment, the number of levels of subcategories may be determined by the site administrator. In another embodiment, the number of levels may be controlled by the site itself. In some implementations, the number of levels may vary based on the number of products listed for sale by the site so that as the number of products increases, the number of levels may increase as well. Process 600 may end at one of block 611 or 615.

The further subcategories may be generated based on the frequency of tags in the products of the subcategory that the further subcategories subcategorize, substantially similar to the process of generating the initial subcategories described above in reference to blocks 603 and 605.

In one embodiment, the further subcategories may be generated by creating appropriate database entries. In the illustrated database embodiment of FIG. 4, the further subcategories may be created by generating appropriate entries in category table 401 illustrated in FIG. 4. For example, the "Art" subcategory of the "History" subcategory of the "Book" category may be created by generating an entry such as the entry corresponding to category ID "2" and category path "Book.History.Art."

In addition to maintaining category and subcategories of existing products listings, an Internet-based shopping site in accordance with one aspects of the present invention may allow sellers to submit new products for sale with the site. These new product listings may then be incorporated into existing categories and subcategories and/or used to generate new categories and subcategories. An example process performed by one embodiment of an Internet-based shopping site is illustrated in FIG. 7 and beginning at block 701.

Figure 8:
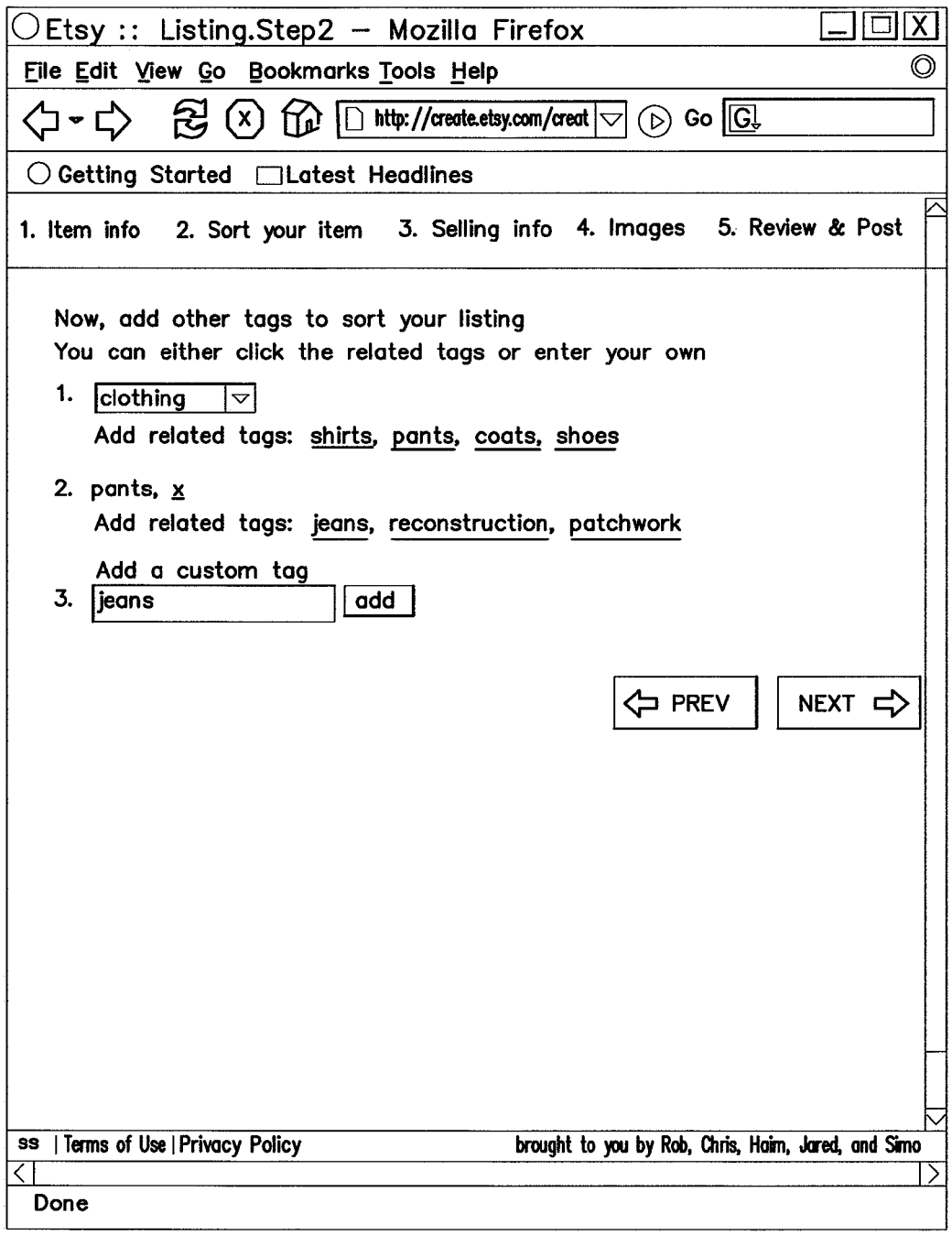
FIG. 8 shows an example interface that may be used to submit new products for sale according to one embodiment of the present invention.

The Internet-based shopping site may present the seller with a submission interface to facilitate the submission of the product, such as a web-based interface. An example of an interface useable with a portion of the submission process explained below is illustrated in FIG. 8. The seller may access the web-based interface with a standard web browser and communicate with the submission component by transmission of HTTP messages to submit information related to the product. In other implementations, the submission component may be configured to accept a message, such as an email message, from the seller in a predetermined format so that the submission component can parse information related to the product from the message.

In one embodiment, the interface may allow sellers to enter and submit information identifying and describing the product to be listed on the Internet-based shopping site. In some implementations, the information may include a name of the product, a description of the product, one or more images of the product, and any other information related to the product. The Internet-based shopping site may receive this information, as indicated in block 703 of FIG. 7.

Figure 7:
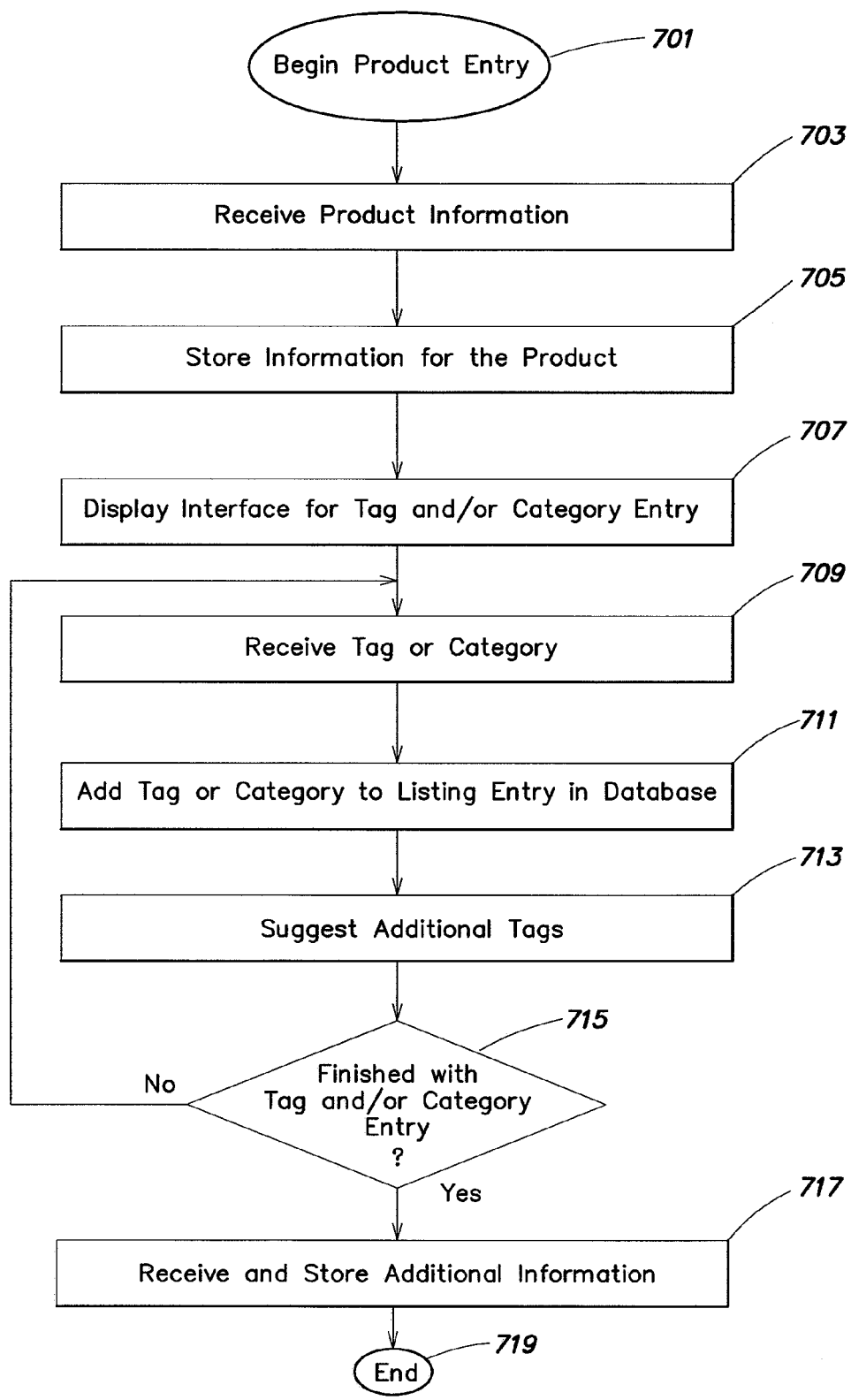
FIG. 7 shows an example process for submitting a new product according to one embodiment of the present invention.

In some embodiments, after receiving the information, the Internet-based shopping site may store the information, as indicated in block 705 of FIG. 7. In one embodiment, storing the information may include generating a table entry in a database. For example, an entry in a listing table (e.g., 307, 403 of either FIG. 3 or FIG. 4) may be generated with the received information being entered in the product information portion of the entry. In some implementations, the product listing and storing of information may occur after the tags and any additional information is entered as described below.

In one embodiment, as indicated in block 707 of FIG. 7, after receiving the initial product information, the Internet-based shopping site may display an interface for entering tag information for the product. The interface illustrated in FIG. 8 may be used for this purpose.

In one embodiment, as illustrated in the interface of FIG. 8, the Internet-based shopping site may require the seller to choose a first tag or category from a list of tags or categories. The list of tags or categories may include a list of existing tags or existing categories. By requiring the first tag to be from the list, the Internet-based shopping site may ensure that the product is associated with at least one known tag or category. In some implementations the list includes tags that are associated with currently defined categories. In other implementations where only subcategories are dynamically generated, the list may include a list of static categories generated by the site administrator.

In one embodiment, when the seller selects the first tag or category, the interface may transmit an indication of the first tag or category to the Internet-based shopping site. When the Internet-based shopping site receives the indication, as indicated in bock 709 of FIG. 7, the Internet-based shopping site may add the tag or category to the database or other storage device used to store the product information. For example, the first tag may be entered into the entry for the product in a listing tables (e.g., 307, 403 of FIGS. 3 or 4).

In one embodiment, the seller may submit many tags and/or categories to describe the product. The site may follow substantially the same process as each new tag is submitted to the site. In some implementations the number of tags or categories that may be submitted may be unlimited. In other implementations, the seller may be limited to a maximum number of tags or categories. By limiting the number of tags or categories, the seller may be motivated to submit only the most relevant tags. The tags may include tags that are selected from a predefined tag list as described above, and/or may include any tag the seller chooses. In an embodiment having tables such as those illustrated in FIG. 3, when a tag is submitted that is not known to the site (i.e., that does not have an entry in tag table 301), the site may generate such an entry as well as entering the new tag into the tags ID element of the product entry in the listing table 307.

As indicated in block 713 of FIG. 7 and illustrated in the interface of FIG. 8, some embodiments of the present invention may be configured to suggest tags to the seller. In one embodiment, the suggested tags may include a list of tags that have been used frequently by other sellers in connection with one or more previously entered tags. In one embodiment, the suggested tags may include a list of tags based on parent or child category/subcategory relationships, or some other hierarchical relationship (e.g., grand parent or grandchild). For example, if the seller enters the tag "clothing" into a system having categories and subcategories illustrated by either the tables of FIG. 3 or FIG. 4, the system may suggest the tag "jeans" and the tag "pants," as illustrated in FIG. 8, because these tags correspond to subcategories of the clothing category.

In some embodiments, after the seller finishes submitting tags to the site (e.g., as indicated at block 715), the Internet-based shopping site may request additional information from the seller related to the sale of the product. This information may include images of the product, seller addresses, limited quantity information, etc. In one embodiment, as indicated in block 717 of FIG. 7, the information may be received by the site and stored with the tags and other product information. For example, this information may be stored in the product information element of listing tables 307, 403 of FIGS. 3 and 4 with other information describing the product that may have been previously submitted. In some implementations, some of the information may be stored in a separate table identifying sellers and information regarding the sellers. Process 700 may end at block 719.

Some embodiments may include a further act of associating the newly entered product with the currently existing categories or subcategories. As described above, with respect to dynamically generating categories, such an act may be performed by entering listing identifiers in a table elements associated with appropriate categories and subcategories. However, such an act is not necessary in the embodiments of tables illustrated in FIGS. 3 and 4 because the product may be associated with the appropriate categories and subcategories when the tags and category IDs are entered into their appropriate tables.

In some embodiments, after receiving the product information and tags and generating appropriate table entries, the Internet-based shopping site may perform a dynamic categorization in accordance with a method such as the one described above so that the categories and/or subcategories are up to date. A site designed to dynamically categorize listed products each time a new product is listed may also dynamically categorize products whenever a listed product is removed from listing, such as when a product sells out, is discontinued, or is removed from listing for some other reason. In other embodiments, dynamic categorization may occur after a set period of time, upon a discretionary initiation by the site administrator, or after a set number of products have been listed or removed from listing.

Figure 9:
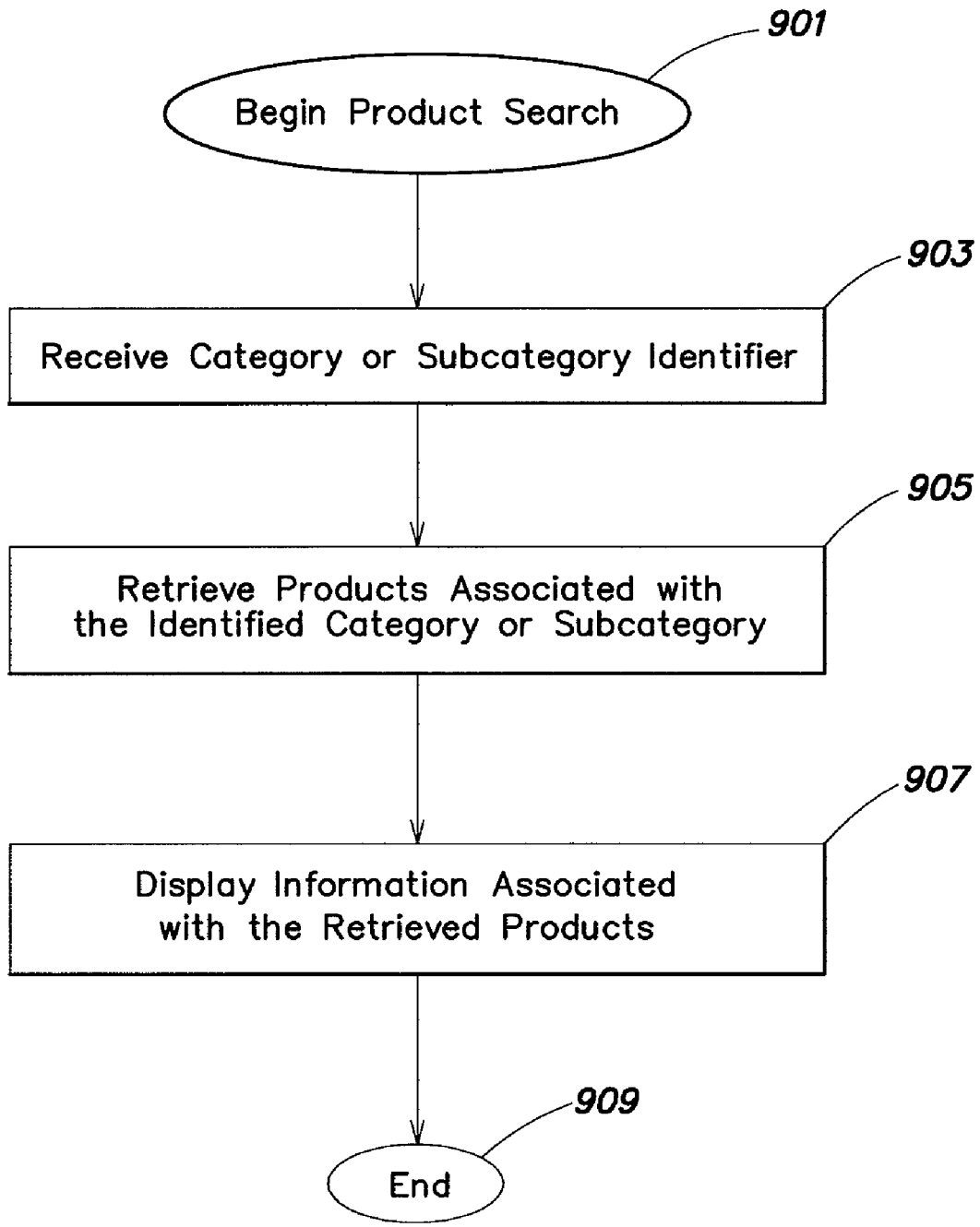
FIG. 9 shows an example process for searching for products by category or subcategory according to one embodiment of the present invention.
Figure 10:
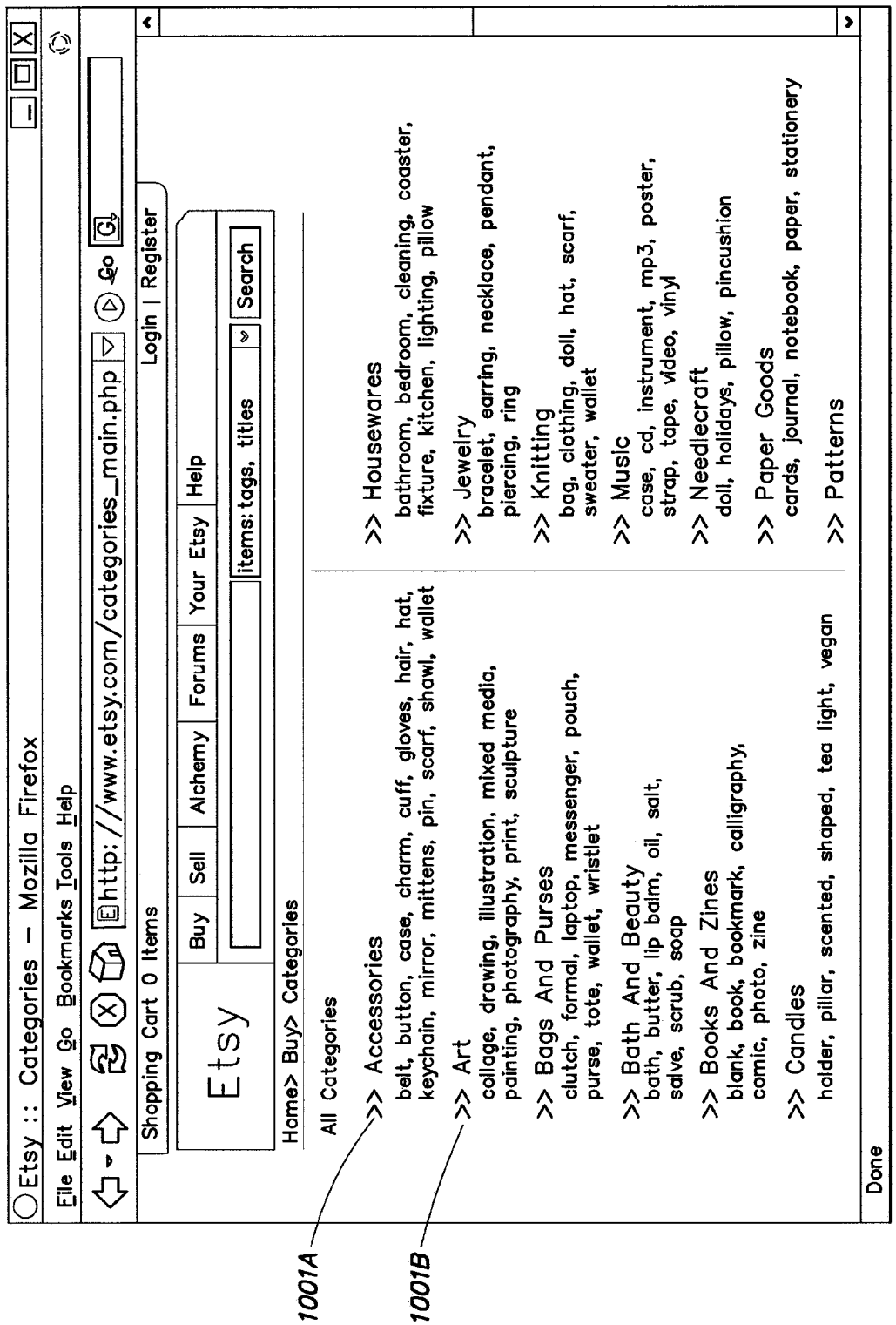
FIG. 10 shows an example interface that may be used to search for products by category according to one embodiment of the present invention.
Figure 11:
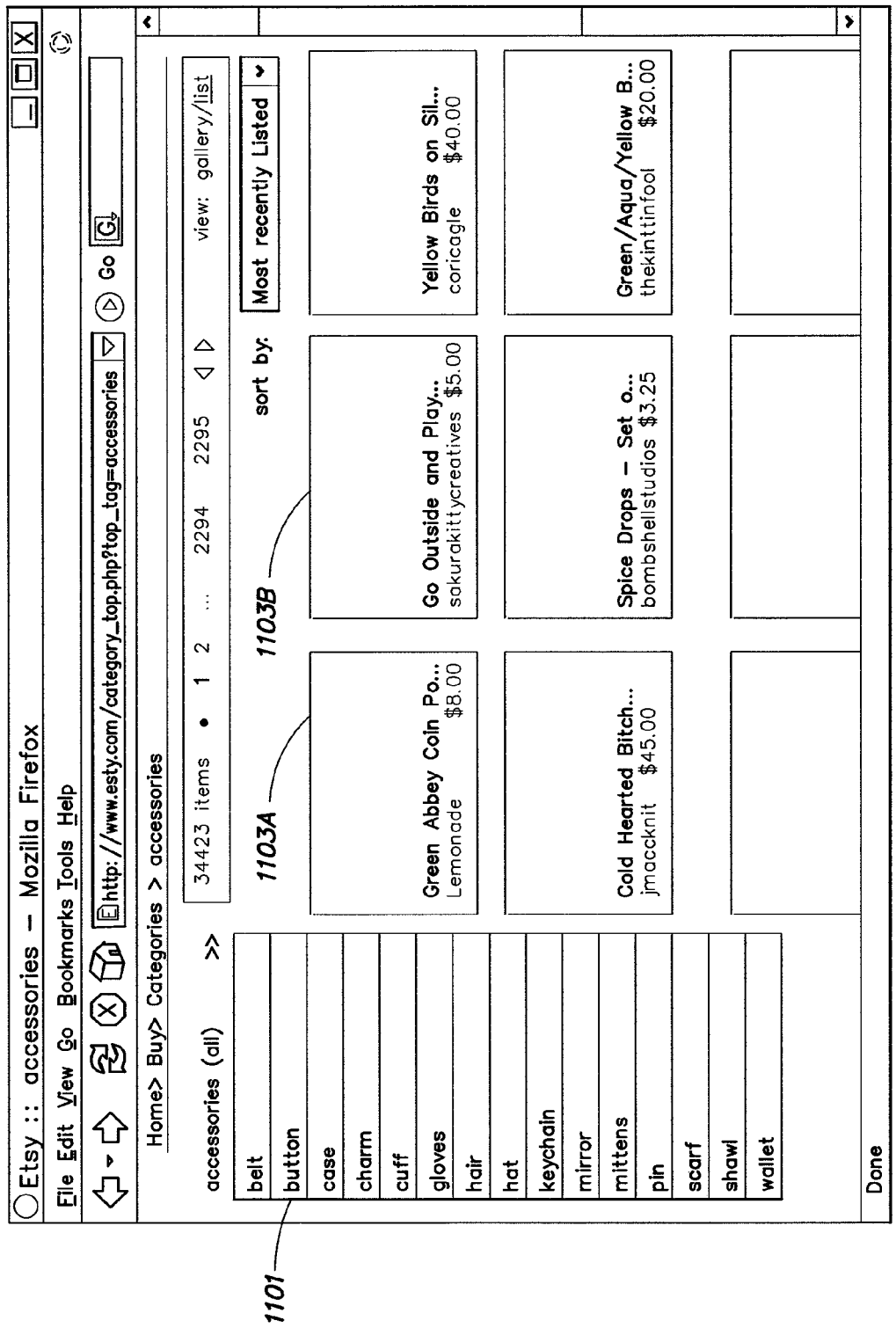
FIG. 11 shows an example interface that may be used to search for products within a category by subcategory according to one embodiment of the present invention.

In one aspect of the present invention, an Internet-based shopping site may allow a shopper to search for products listed with the site to aid the shopper in finding specific products. One search tool that may be included in some embodiments may perform a search based on the dynamically generated categories and/or subcategories described above. An example of a process that may be performed by an Internet-based shopping site to carry-out such a search is illustrated in FIG. 9 and begins at block 901. Several example interfaces that may be used to facilitate such a search are illustrated in FIGS. 10 and 11.

In some embodiments, as indicated in block 903 of FIG. 9, the Internet-based shopping site may receive an indication of a category or subcategory for which the shopper is searching. In one embodiment, the indication may be in the form of a category ID, such as the ones listed in categories tables 303, 401 of FIGS. 3 and 4. In one embodiment, the indication may be in the form of a category ID and a tag ID such as those listed in subcategory table 305 of FIG. 3. In other embodiments, the indication may be any other indication that can be used to determine a category or subcategory based on stored information.

In one embodiment, the information may be included within an HTTP message sent from the shopper to the Internet-based shopping site. An example web-based interface for sending such an HTTP message identifying a category is illustrated in FIG. 10. A shopper may select one of the listed categories (e.g., Accessories, Art, Bags & Purses, Bath & Beauty, Books & Zines, Candles, etc.) by clicking the word identifying the category 1001A-B. FIG. 11 illustrates an example interface for sending a message identifying a subcategory within the accessories category. In this example, the shopper may click on one of the subcategories 1101 listed under the subcategories title to send an HTTP message to the Internet-based shopping site identifying that subcategory.

In some embodiments, after receiving the category or subcategory identifier, the Internet-based shopping site may determine the products associated with the identified category or subcategory, as indicated in block 905 of FIG. 9.

In one embodiment, determining the products associated with the identified category or subcategory may include a step of identifying the tags associated with the identified category or subcategory. The tags may be determined by querying the information stored by the site. For example, in an embodiment of an Internet-based shopping site that maintains tables similar to those of FIG. 4, if the site receives an indication of category ID 1, the site may query the database to determine the matching tags "Book" and "History" from category table 401.

Such an embodiment may then determine the products associated with the determined tags. These products may be determined by querying the information stored by the site. For example, in an embodiment of an Internet-based shopping site that maintains tables similar to those of FIG. 4, after the site determines the matching tags "Book" and "History," the site may search the listing table 403 for each entry having both the "Book" and "History" tags in the tags portion of the listing. Any listing that has such matching tags may be associated with the identified category or subcategory.

In another embodiment, determining the products associated with the identified category or subcategory may not include an act of determining the tags associated with the identified category. Rather, the information identifying the category or subcategory may be sufficient to identify the products associated with the identified category or subcategory directly. For example, in an embodiment of an Internet-based shopping site that maintains a set of database tables similar to the tables illustrated in FIG. 3, when an indication of category ID 0 and Tag ID 9 is received by the site, the site may query listing table 307 to find each listing having a tag ID 9 in its tag IDs portion and a category ID 0 in its category IDs portion. Any listing that has such matching tags and categories may be associated with the identified subcategory. In one embodiment, a search for a category may need only to search for entries having a matching category ID in the category IDs portion.

In some embodiments, the Internet-based shopping site may display information related to the identified products, as indicated in block 907 of FIG. 9. In one embodiment, the displayed information for each product may include some or all of the information entered by the seller of the product when the product was first listed for sale with the site. In one embodiment, the information may include an image of the product, a price of the product, a description of the product, a number of the product in stock, a date the product was listed, and any other information that may be helpful to a shopper.

Figure 12:
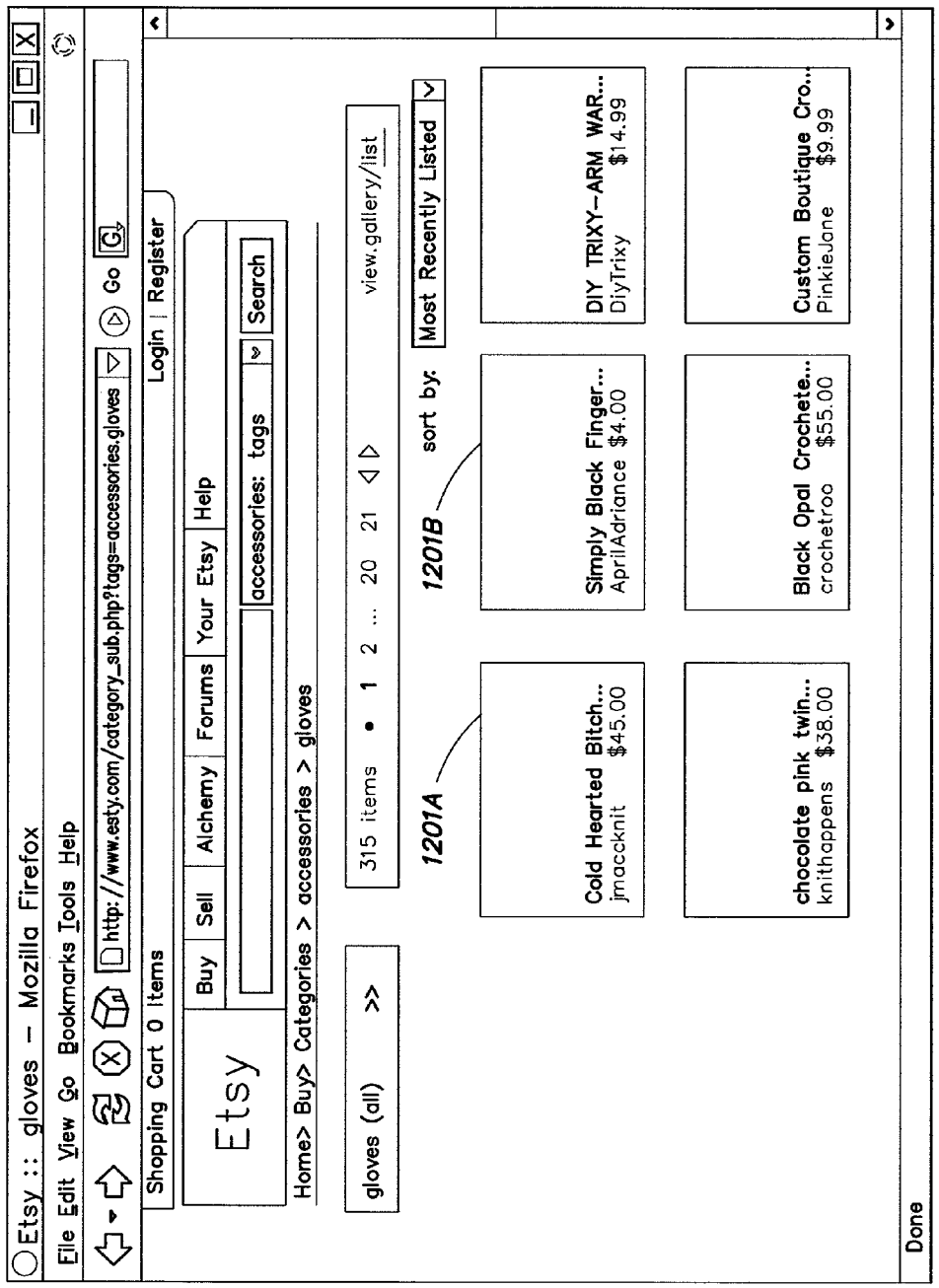
FIG. 12 shows an example interface that may be used to shop for products within a subcategory according to one embodiment of the present invention.

In some embodiments, the displayed information may be presented to the shopper in a web-based interface such as the one illustrated in FIGS. 11 and 12. FIG. 11 illustrates an example interface displaying product information for an "Accessories" category. This example interface also may allow the shopper to submit further search information related to the subcategories 1101 of the "Accessories" category. The listing of these subcategories may be determined by the Internet-based shopping site using the received category or subcategory identifying information by querying the appropriate database tables.

For example, if the category ID 2 identifying the "accessories" tag is received by an embodiment of an Internet-based shopping site that maintains database tables similar to those illustrated in FIG. 3, the subcategories may be determined by querying a subcategories table for entries have a category ID 2 in their category ID portion. Each such matching entry may be a subcategory of the "Accessories" category, and the name of the subcategory may be determined by querying a tag table (e.g., the subcategories of the Accessories category in the database of FIG. 3 are "Purse" and "Jewelry").

As another example, in an embodiment of an Internet-based shopping site that maintains information similar to that illustrated in FIG. 4, the subcategory listing may be determined by querying category table 401. For example, if the category ID 7 is received by the site, the site may query categories table 401 to determine the path "clothing." The site may determine subcategories of the category "Clothing" by searching for entries that have a path matching the identified path and one additional path element (e.g., the subcategories of the clothing category in FIG. 4 are "Pants" and "Shirt"). Such an embodiment may perform the same or substantially the same search process to determine the subcategories of a subcategory. For example, if the site received a category ID of 8, the site may query category table 401 to determine the path "Clothing.Pants." The site may then query category table 401 again to determine any entry that has a matching path with one additional element (e.g., "Clothing.Pants.Jeans"). In the example of FIG. 4, the subcategory "Pants" of the category "Clothing" has only one subcategory of its own, namely "Jeans."

FIG. 12 illustrates an example interface that presents product information for products associated with the subcategory "Gloves" of the category "Accessories," in accordance with one embodiment. This interface does not present the shopper with the option of searching for further subcategories because the "Gloves" subcategory has no further subcategories of its own. If there were further subcategories of the "Gloves" subcategory, the site may present the shopper with such further search options.

In some embodiments, a category or subcategory search tool may be combined with one or more additional search tools. For example, a shopper may be allowed to search within a category or subcategory for an object having a specific keyword or keywords in the product's description, a specific brand or model name, a specific material composition, or any other information that may have been entered by the seller of the product or other shoppers regarding the product (e.g., ranking or satisfaction information from other shoppers that have previously purchased the product).

Figure 13:
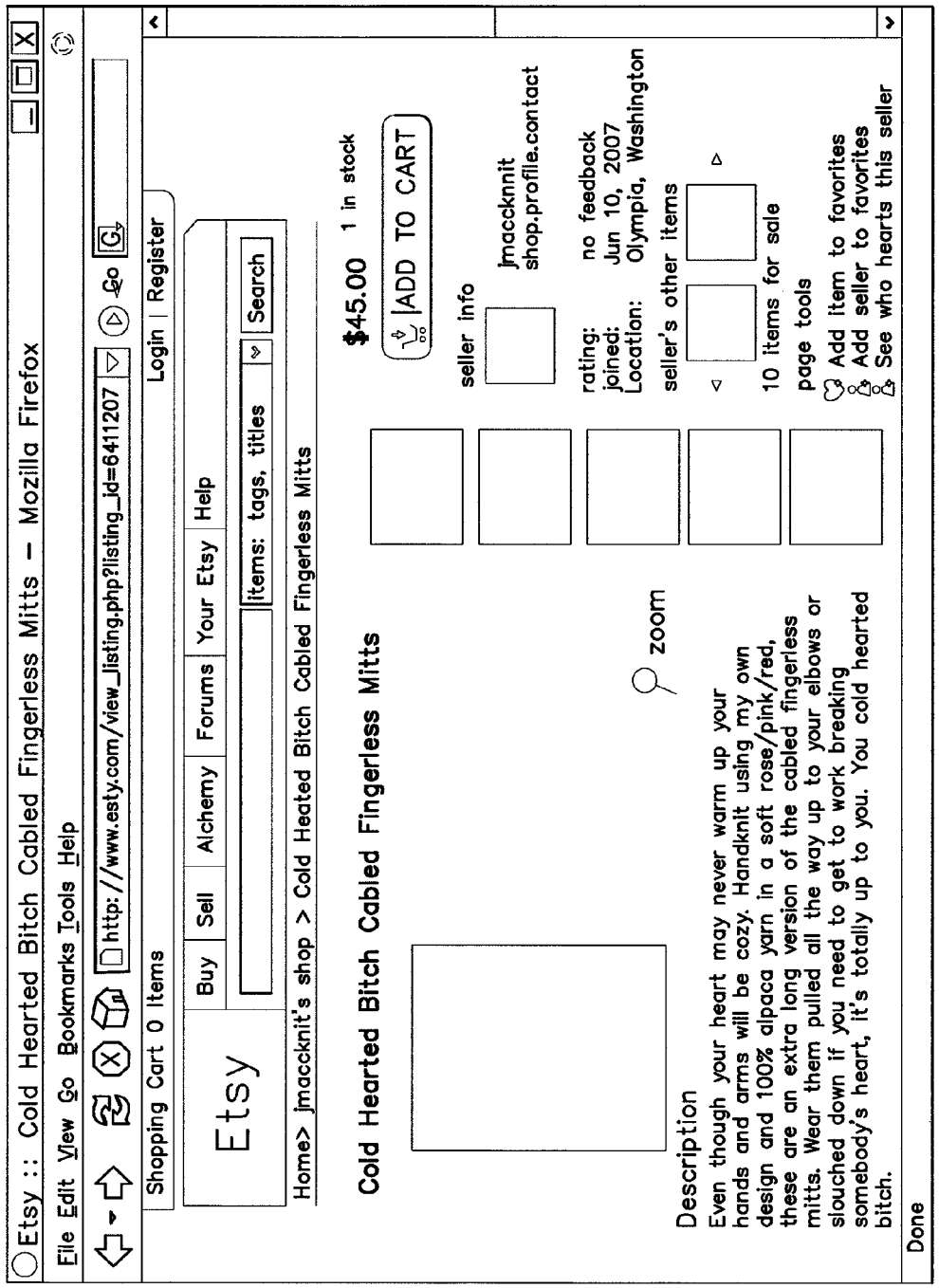
FIG. 13 shows an example interface that may be used to indicate a desire to purchase a product according to one embodiment of the present invention.

In some embodiments of the present invention, the Internet-based shopping site may allow shoppers to purchase products found through a category or subcategory search. For example, in the illustrated examples of FIGS. 11 and 12, the shopper may click on one of the product images 1103A-B, 1201A-B to identify that product to the Internet-based shopping site, for example, by sending an HTTP message to the site identifying the listing ID of the product. The Internet-based shopping site may direct the shopper to an interface such as the one illustrated in FIG. 13 that displaying additional information associated with the product and presents the shopper with the option of buying the product (e.g., the "Add to Cart" button).

In some implementations, if the shopper clicks on the "Add to Cart" button the site may add the product to the shopper's listed of products to be purchased or shopping cart. When the shopper finishes shopping, the shopper may indicate to the site that he or she wishes to finish shopping the shopper may then be directed to a buying interface.

The buying interface may then allow the buyer to select one or more payment methods (e.g., credit card, check, cash, etc.), enter payment information (e.g., billing address, credit card number, check routing information), and enter shipping information. The buying component may be configured to receive payment from the entered payment method, by, for example billing the buyer's credit card or checking account.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A method for selling a product, the method comprising acts of:
   A) determining, by a database server, a frequency with which at least one first tag is associated with a plurality of listed products listed for sale in a database;
   B) maintaining , by the database server, at least one of a list of potential categories and a list of potential subcategories based, at least in part, on the frequency with which the at least one first tag is associated with the plurality of listed products;
   C) receiving the at least one first tag describing the product; and
   D) associating, by the database server, the product with at least one of at least one first category from the list of potential categories and at least one first subcategory from the list of potential subcategories, based, at least in part, on the at least one first tag.

2. The method of claim 1, further comprising acts of:
   E) receiving at least one second category of the product; and
   F) associating the product with the at least one second category, wherein the act D comprises an act of associating the product with at least one subcategory based, at least in part, on the at least one first tag.

3. The method of claim 2, wherein the at least one second category is selectable from a predefined category list.

4. The method of claim 3, wherein a user selects the at least one second category from the predefined category list before the act E.

5. The method of claim 1, wherein the at least one first tag is selectable from a predefined tag list.

6. The method of claim 5, wherein a user selects the at least one first tag from the predefined tag list before the act A.

7. The method of claim 5, wherein each tag of the predefined tag list is associated with at least one of the potential categories and the potential subcategories.

8. The method of claim 1, wherein each tag of the at least one first tag includes at least one keyword describing the product.

9. The method of claim 1, further comprising an act of limiting a number of the at least one first tag to a maximum number of first tags.

10. The method of claim 1, further comprising an act of suggesting at least one second tag based, at least in part, on the at least one first tag.

11. The method of claim 10, wherein the at least one second tag is associated with a plurality of previously submitted products that are also associated with the at least one first tag.

12. The method of claim 10, wherein the at least one second tag is associated with at least one of a second category and a second subcategory that hierarchically relates to the at least one of the first category and first subcategory.

13. The method of claim 12, wherein the at least one of the group comprising the second category and second subcategory includes at least one of a parent category, a parent subcategory, and a child subcategory of the at least one of the first category and first subcategory.

14. The method of claim 1, wherein each potential category and potential subcategory is associated with at least one of a plurality of second tags.

15. The method of claim 14, wherein the plurality of second tags includes the at least one first tag and the act B comprises an act of associating the product with the at least one first category from the list of potential categories that is associated with the at least one first tag.

16. The method of claim 15, wherein each potential subcategory is hierarchically related to at least one potential category.

17. The method of claim 16, wherein a second tag associated with at least one first potential subcategory that is hierarchically related to a first potential category is also associated with at least one second potential subcategory that is hierarchically related to a different second potential category.

18. The method of claim 16, wherein at least one first potential subcategory is hierarchically related to at least one second potential subcategory.

19. The method of claim 18, wherein the act B comprises an act of associating the product with the at least one first subcategory from the list of potential subcategories that is associated with the at least one first tag and that hierarchically descends from at least one of a second potential category and a second potential subcategory associated with the at least one first tag.

20. The method of claim 1, wherein at least one of the list of potential categories and the list of potential subcategories is based, at least in part, on a plurality of tags describing a plurality of previously submitted products.

21. The method of claim 20, wherein at least one of the list of potential categories and the list of potential subcategories is based, at least in part, on a frequency of tags in the plurality of tags.

22. The method of claim 1, further comprising an act of C) responding to a request that identifies at least one of at least one second category and at least one second subcategory with a representation of submitted products, including the first product and other previously submitted products, associated with the at least one of at least one second category and at least one second subcategory, respectively.

23. The method of claim 22, wherein a user submits the request prior to the act C.

24. The method of claim 1, further comprising an act of maintaining at least one of the list of potential categories and the list of potential subcategories, based at least in part on a plurality of other tags associated with a plurality of previously submitted products, wherein that list of potential categories and the list of potential subcategories includes the at least one first category and the at least one first subcategory, respectively.

25. The method of claim 24, wherein the act of maintaining at least one of the list of potential categories and the list of potential subcategories includes updating at least one of the list of potential categories and the list of potential subcategories based, at least in part on at least one first change to the plurality of previously submitted products.

26. The method of claim 25, wherein the plurality of previously submitted products were previously submitted by a plurality of users and the at least one first change includes at least one second change made by at least one of the plurality of users.

27. The method of claim 25, wherein the at least one first change includes a threshold number of changes and the act of maintaining at least one of the list of potential categories and the list of potential subcategories includes updating the at least one of the list of potential categories and the list of potential subcategories after the threshold number of changes to the previously submitted products.

28. The method of claim 25, wherein the act of maintaining at least one of the list of potential categories and the list of potential subcategories includes periodically updating the at least one of the list of potential categories and the list of potential subcategories.

29. A system for managing products for sale, the system comprising:
  a processor and a memory coupled together, the memory including instructions that when executed by the processor cause the processor to execute:
    a category component configured to determine a frequency with which at least one first tag is associated with a plurality of listed products listed for sale in a database and maintain a list of potential categories and potential subcategories based, at least in part, on the frequency with which the at least one first tag is associated with the plurality of listed products; and
    a submission component configured to accept submission of at least one first product and the at least one first tag describing the at least one first product and to associate the at least one first product with at least one of a first category and a first subcategory of the list of potential categories and potential subcategories, based, at least in part, on the at least one first tag.

30. The system of claim 29, wherein the submission component is further configured to accept submission of at least one second category and to associate the at least one first product with the at least one second category.

31. The system of claim 29, wherein the at least one first tag is selectable from a predefined tag list.

32. The system of claim 31, wherein the submission component is adapted to accept the submission of the at least one first product from a user.

33. The system of claim 32, wherein each tag of the predefined tag list is associated with at least one of the potential categories and potential subcategories.

34. The system of claim 29, wherein the at least one first tag includes at least one keyword describing the product.

35. The system of claim 29, wherein the submission component is further configured to suggest at least one second tag based, at least in part, on the at least one first tag.

36. The system of claim 35, wherein the at least one second tag is associated with a plurality of previously submitted products that are also associated with the at least one first tag.

37. The system of claim 35, wherein the at least one second tag is associated with at least one of a second category and a second subcategory that is hierarchically related to the at least one of the first category and first subcategory.

38. The system of claim 29, wherein the category component is further configured to associate each potential category and potential subcategory with at least one previously entered tag.

39. The system of claim 38, wherein the category component is configured to associate the first product with the at least one first category if the at least one first category is associated with the at least one first tag.

40. The system of claim 39, wherein the category component is further configured to maintain the list of potential categories and potential subcategories in at least one tree structure, such that each potential subcategory is hierarchically related to at least one potential category.

41. The system of claim 40, wherein a second tag associated with at least one first potential subcategory that is hierarchically related to a first potential category is also associated with at least one second potential subcategory that is hierarchically related to a different second potential category.

42. The system of claim 40, wherein at least one first potential subcategory is hierarchically related to at least one second potential subcategory.

43. The system of claim 42, wherein the category component is configured to associate the at least one first product with the at least one first subcategory from the list of potential subcategories if the first subcategory is both associated with the at least one first tag and hierarchically descends from at least one of a second potential category and a second potential subcategory associated with the at least one first tag.

44. The system of claim 29, wherein the category component is further configured to maintain at least one of the list of potential categories and the list of potential subcategories based, at least in part, on a plurality of tags associated with a plurality of previously submitted products.

45. The system of claim 44, wherein the category component is further configured to update at least one of the list of potential categories and the list of potential subcategories based, at least in part, on at least one first change to the previously submitted products.

46. The system of claim 45, wherein the category component is further configured to periodically update at least one of the list of potential categories and the list of potential subcategories.

47. The system of claim 45 wherein the at least one first change includes a threshold number of first changes, and the category component is further configured to update the at least one of the list of potential categories and the list of potential subcategories after the threshold number of changes to the previously submitted products.

48. The system of claim 44, wherein the category component is further configured to maintain at least one of the list of potential categories and the list of potential subcategories based, at least in part, on a frequency of tags in the plurality of tags.

49. The system of claim 29, further comprising a search component configured to search the at least one first product and a plurality of other products previously submitted to the system based, at least in part, on one of at the least one first category and at least one first subcategory.

50. The system of claim 49, wherein the search component is further configured to accept a search request identifying at least one of the at least one first category and at least one first subcategory and respond with a representation of all products from the at least one first product and the plurality of other products that are associated with the at least one of the at least one first category and at least one first subcategory.

51. The system of claim 49, wherein the search component is adapted to accept the search request from a user.

52. The system of claim 29, further comprising at least one storage component configured to store at least one first representation of the at least one first product and at least one second representation of the list of potential categories and potential subcategories in at least one database table.

* * * * *

UNITED STATES PATENT AND TRADEMARK OFFICE
CERTIFICATE OF CORRECTION

PATENT NO. : 8,108,260 B2
APPLICATION NO. : 11/828797
DATED : January 31, 2012
INVENTOR(S) : Christopher Maguire et al.

It is certified that error appears in the above-identified patent and that said Letters Patent is hereby corrected as shown below:

In the Specification:

At column 2, line number 48, delete "modem" and replace it with --modern--; and

At column 13, line number 32, delete "Modem" and replace it with --Modern--.

Signed and Sealed this
Twenty-seventh Day of March, 2012

David J. Kappos
*Director of the United States Patent and Trademark Office*